United States Patent [19]

Munro

[11] 4,029,821
[45] June 14, 1977

[54] ANIMAL FOOD

[75] Inventor: Douglas Newton Munro, Stathern, England

[73] Assignee: Pedigree Petfoods Limited, Melton Mowbray, England

[22] Filed: Jan. 7, 1976

[21] Appl. No.: 647,141

Related U.S. Application Data

[63] Continuation-in-part of Ser. No. 327,221, Jan. 26, 1973, abandoned.

[52] U.S. Cl. .................................. 426/92; 426/99; 426/303; 426/307; 426/623; 426/805
[51] Int. Cl.$^2$ ...................... A23K 1/00; A23K 1/16
[58] Field of Search ................................... 426/1, 2

[56] References Cited

UNITED STATES PATENTS

| | | | |
|---|---|---|---|
| 2,566,549 | 9/1951 | Beckwith | 426/376 |
| 3,359,115 | 12/1967 | Lanz | 426/376 |
| 3,467,525 | 9/1969 | Hale | 426/805 |
| 3,745,023 | 7/1973 | Greenberg | 426/805 |
| 3,808,340 | 4/1974 | Palmer | 426/805 |
| 3,808,341 | 4/1974 | Rongey et al. | 426/305 |

Primary Examiner—Jeanette M. Hunter
Attorney, Agent, or Firm—Davis, Hoxie, Faithfull & Hapgood

[57] ABSTRACT

The invention concerns food products in the form of bite-sized particles coated with a flavored coating. The characteristic of this invention is a coating containing condensed fish solubles on a core of less palatable material usually of cereal or vegetable protein origin. Cereal or other vegetable cores, for example in the form of biscuit pieces, can be sprayed with condensed fish solubles and molten fat to produce a food product which is highly acceptable to cats and dogs.

5 Claims, No Drawings

ANIMAL FOOD

This application is a continuation in part of my prior application Ser. No. 327,221, filed Jan. 26, 1973, and now abandoned.

The present invention relates to improvements in animal foods, and in particular to substantially dry foods, more especially for cats and dogs.

Food products for cats and dogs have been described in which pieces of a less palatable core of, for example, biscuit or other dry material are covered with a more palatable coating of, for example, meat-flavour or gravy-forming ingredients. One of the advantages achieved by this coating techniques is that the resultant pieces can have a better flavour acceptance by the animal than either the core material by itself or than a material which is a homogeneous mixture of the total ingredients of the core and coating.

It has now been found that substantially similar benefits can be obtained by using as the palatable outer coating an application of condensed fish solubles.

Thus this invention provides an animal food, more especially a food for cats or dogs, which comprises pieces of a dry edible composition coated with a composition comprising condensed fish solubles.

"Condensed fish solubles" is a commercially available material typically obtained by the treatment and concentration of fish stickwater. Fish strickwater is a by-product in the production of fish meal by the wet reduction process.

In a typical process the fish are cooked and then pressed. The press cake is dried and becomes fish meal. The press liquor which contains both oil and a water solution is separated into oil and water phases either in settling tanks or by centrifugation. The water phase or stickwater may then by condensed to about 50 percent solids. In some plants this condensed stickwater is fed back into the fish meal. Where the product is to be sold as such it may be acidified to a pH below 5.0 to prevent bacterial spoilage which occurs rapidly at or near a neutral pH. The acid employed may be a non-toxic inorganic or mineral acid or acid salt. Sulphuric and phosphoric acids have been commonly used. The final pH achieved may vary but is generally within the range 2-5. Organic acids, for example citric acid, can also be used for stabilization, but are more expensive.

This acidified condensed strickwater is referred to as "condensed fish solubles". The process described is, however, only one example of the production of condensed fish solubles, for which there are numerous processes, and the term is intended to cover any product concentrated from fish stickwater.

The inner substantially dry core of the product may be any edible material which will form a structure to which the outer coating can be applied. Generally such a core, although regarded as suitable food, will be less palatable than the outer coating and typically the core is biscuit, expanded or compressed cereal product, textured vegetable protein or mixtures thereof.

The pieces to which the outer coating is applied may be of any size but is normally such that the final coated product will be in pieces of a suitable size for presentation to the intended consumer. Typically, for a cat, the core pieces would be of ½ -¾ inch dimensions and, for a dog, of ¼ -1 inch dimensions.

The coating may consist of condensed fish solubles alone or it may include additives such as nutrients, typically fat or other flavouring or colouring agents.

The condensed fish solubles can be so applied to the food core particles as to cover the exposed surfaces or at least a major part thereof, but need not constitute a continuous film or layer. A typical coating method is spraying by which much, if not the total, surface areas are coated. Even if a portion of the particle surface remains uncoated, there is still a substantial and significant increase in the palatability of the particles. This significant increase in the palatability of the particles arises from the concentration of the condensed fish solubles on or near the surface. The preferred concentration level of condensed fish solubles employed varies according to the product but is typically in the range 0.5 -15 weight percent, and more especially 2.5 -9 per cent.

The fat referred to may be any edible fat but it is preferred to use an animal fat such as lard or tallow. The level employed is generally in the range 0.5 -15 percent by weight, with 4 -10 percent preferred. The fat component of the coating, if used, may be applied to the food core particles usually with the fish solubles but may also be applied either before or after they have been treated with the condensed fish solubles.

The condensed fish solubles, and fat where used, may be applied to the particles of food in any manner which results in their being concentrated on or near the surface. The best procedure in any particular case depends on the nature of the food particles and on the physical state of the fat and condensed fish solubles. Simple routine experimentation will establish the best conditions. In general, coverage may be achieved by spraying the condensed fish solubles and molten fat onto the food particles.

The invention is illustrated by the following example in which all parts and percentages are quoted by weight.

EXAMPLE 1

The following materials were mixed:

| | | |
|---|---|---|
| Ground wheat | 37 | lb. |
| Ground maize | 35 | lb. |
| Fish meal | 90 | lb. |
| Additive mix* | 13.25 | lb. |
| Beef tallow | 14.4 | lb. |
| Flavouring | 2.1 | lb. |
| * Additive mix = Brewers yeast | 15 | lb. |
| Wheat germ meal | 13 | lb. |
| Skimmed milkpowder | 4.5 | lb. |
| Salt | 5 | lb. |
| Meat and bone meal | 5 | lb. |
| Mineral supplement | 81 | g. |
| Vitamin supplement | 407 | g. |
| Titanium dioxide | 57 | g. |
| Sunset Yellow dye | 80 | g. |
| Erythrosine | 136 | g. |

The mixture was expanded, with sufficient water, through an Anderson expanding machine and the pellets were dried in a steam oven to 6 -8% moisture. These dried extruded pellets were carried from the drier whilst still hot and sprayed (7%) with condensed fish solubles (which had been stabilised by reducing the pH to 4.6 using sulphuric acid). The product was preference tested with cats against the same formulation in which the condensed fish solubles had been incorporated within the pellets at the same total level. The cats preferred the coated product. When equal quantities of each food were presented simultaneously to the cats, of the total food eaten, 92% was the coated product.

EXAMPLE 2

A food product was prepared similarly to Example 1, except that the product was sprayed with condensed fish solubles (7%) and with beef tallow (7%). The resulting product was preference tested against a similar product with both ingredients within the pellet and at the same total level. In this case, 95% of the product eaten was the coated product.

EXAMPLE 3

Example 1 was repeated in similar fashion but with dried expanded pellets of ground wheat, ground maize, bone flour, mineral supplement, vitamin supplement, salt and Edicol Supra Caramel dye, and the preference test was made with dogs. In this case, 91% of the product eaten was the coated product.

EXAMPLE 4

Example 2 was repeated with pellets as Example 3, and the preference test was made with dogs. In this case, 95% of the product eaten was the coated product.

I claim:

1. As a food composition for animals, discrete bite-sized particles comprising a dry coherent food material selected from the group consisting of cereal, fish meal and mixtures thereof, and a coating of condensed fish solubles on said particles providing a concentration of the condensed fish solubles on or near the surface of said particles and constituting from 0.5–15% of said total food composition.

2. A food composition according to claim 1 wherein said coating additionally comprises fat in an amount of from 0.5–15% of said total food composition.

3. A food composition according to claim 1 wherein said coating additionally comprises another flavouring material.

4. A method of making a food composition for animals comprising the steps of preparing dry edible bite-sized pieces of a composition from ingredients selected from the group consisting of cereal, fish meal and mixtures thereof spraying said pieces with a flavouring composition comprising condensed fish solubles providing a concentration of the condensed fish solubles on or near the surface of said pieces in an amount sufficient to provide from 0.5–15% of said total food composition when dried; and drying said coated pieces.

5. A method according to claim 4 comprising the additional step of spraying said pieces with molten fat.

* * * * *

UNITED STATES PATENT AND TRADEMARK OFFICE
CERTIFICATE OF CORRECTION

PATENT NO. : 4,029,821
DATED : June 14, 1977
INVENTOR(S) : Douglas Newton Munro

It is certified that error appears in the above-identified patent and that said Letters Patent are hereby corrected as shown below:

Column 1, line 15, "techniques" should be--technique--.

Column 1, line 30, "strickwater" should be--stickwater--.

Column 1, line 49, "strickwater" should be--stickwater--.

Column 1, line 67, "1/2" should be--1/4--.

Signed and Sealed this

Eleventh Day of April 1978

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,029,821
DATED : June 14, 1977
INVENTOR(S) : Douglas Newton Munro

It is certified that error appears in the above-identified patent and that said Letters Patent are hereby corrected as shown below:

On the title page;
Change the designation of the assignee appearing on the first page by deleting "Pedigree Petfoods Limited, Melton Mowbray, England" and substituting the name of the assignee designated as follows:

Assignee: Mars Limited
                    London, England

Signed and Sealed this

Thirteenth Day of August 1985

[SEAL]

*Attest:*

DONALD J. QUIGG

*Attesting Officer*      *Acting Commissioner of Patents and Trademarks*